(12) United States Patent
Yang

(10) Patent No.: US 10,362,023 B2
(45) Date of Patent: Jul. 23, 2019

(54) AUTHENTICATION INFORMATION ENCRYPTION SERVER APPARATUSES, SYSTEMS NON-TRANSITORY COMPUTER READABLE MEDIUMS AND METHODS FOR IMPROVING PASSWORD SECURITY

(71) Applicant: LINE Corporation, Tokyo (JP)

(72) Inventor: Heechan Yang, Tokyo (JP)

(73) Assignee: Line Corporation, Tokyo (JP)

( * ) Notice: Subject to any disclaimer, the term of this patent is extended or adjusted under 35 U.S.C. 154(b) by 568 days.

(21) Appl. No.: 14/830,388

(22) Filed: Aug. 19, 2015

(65) Prior Publication Data

US 2016/0212119 A1 Jul. 21, 2016

(30) Foreign Application Priority Data

Jan. 20, 2015 (JP) ................................. 2015-008296

(51) Int. Cl.
*H04L 29/06* (2006.01)
*H04L 9/32* (2006.01)
(Continued)

(52) U.S. Cl.
CPC ............ *H04L 63/083* (2013.01); *G06F 21/31* (2013.01); *G06F 21/45* (2013.01); *H04L 9/0863* (2013.01); *H04L 9/3226* (2013.01); *H04W 12/06* (2013.01)

(58) Field of Classification Search
CPC .... H04L 63/0869; H04L 9/3228; G06F 21/31
(Continued)

(56) References Cited

U.S. PATENT DOCUMENTS 7,278,023 B1 * 10/2007 Siegel ..................... G06F 21/31
380/30
2005/0144484 A1 * 6/2005 Wakayama ............. G06F 21/31
726/19
(Continued)

FOREIGN PATENT DOCUMENTS

GB 2504746 A * 2/2014 ........... H04L 9/3242
JP 2007052489 A 3/2007
(Continued)

OTHER PUBLICATIONS

Korean Office Action dated Feb. 25, 2019 for corresponding Korean Application No. 10-2017-7018555.

*Primary Examiner* — Bryan F Wright
(74) *Attorney, Agent, or Firm* — Harness, Dickey & Pierce, P.L.C.

(57) ABSTRACT

There is provided an authentication server apparatus connected with a terminal device through a network including a storage device configured to store pattern descriptions, wherein characters used for an authentication password for authenticating a user are divided into groups, and the divided characters are associated with IDs of the respective groups in one of the pattern descriptions, a password processing unit configured to generate an authentication code composed of a string of the IDs of the groups and to store it, wherein the authentication code is generated on a pattern description— by —pattern description basis, a screen transmitting unit configured to transmit data of an authentication screen including one of the pattern descriptions to the terminal device, and an authentication unit configured to authenticate the user based on the string of the IDs corresponding to the authentication password and the authentication code corresponding to the pattern description.

12 Claims, 8 Drawing Sheets

24D

USER ID: user002

USER ID: user001

| PATTERN ID | AUTHENTICATION CODE |
|---|---|
| P001 | G2, G1, G1, G2, G3, G4, G4 |
| P002 | G2, G1, G1, G2, G3, G3, G3 |
| P003 | G2, G1, G2, G2, G3, G4, G4 |
| P004 | G1, G2, G2, G2, G3, G3, G4 |
| ... | ... |

(51) Int. Cl.
*G06F 21/31* (2013.01)
*G06F 21/45* (2013.01)
*H04L 9/08* (2006.01)
*H04W 12/06* (2009.01)

(58) Field of Classification Search
USPC ............................................................ 726/6
See application file for complete search history.

(56) References Cited

U.S. PATENT DOCUMENTS

| | | | | |
|---|---|---|---|---|
| 2007/0226784 | A1* | 9/2007 | Ueda ........................ | G06F 21/36 |
| | | | | 726/5 |
| 2011/0202981 | A1* | 8/2011 | Tamai ..................... | G06F 21/10 |
| | | | | 726/6 |
| 2012/0137131 | A1* | 5/2012 | Lu .......................... | H04L 9/3228 |
| | | | | 713/168 |
| 2012/0191856 | A1* | 7/2012 | Chen ..................... | G06F 9/5083 |
| | | | | 709/226 |
| 2013/0061298 | A1* | 3/2013 | Longobardi ............ | G06F 21/42 |
| | | | | 726/6 |
| 2015/0128234 | A1* | 5/2015 | Xavier ................ | H04L 63/0869 |
| | | | | 726/6 |
| 2015/0312242 | A1* | 10/2015 | Ogawa .................... | G06F 21/34 |
| | | | | 726/6 |

FOREIGN PATENT DOCUMENTS

| | | |
|---|---|---|
| JP | 4758175 B2 | 8/2011 |
| JP | 2013097730 A | 5/2013 |
| JP | 2013250627 A | 12/2013 |
| KR | 1020140032818 A | 3/2014 |

* cited by examiner

| PATTERN ID | GROUP PATTERN | | | |
|---|---|---|---|---|
| | G1 | G2 | G3 | G4 |
| P001 | 1, 2, 4, 5 | 3, 6 | 7, 0 | 8, 9 |
| P002 | 1, 2, 4, 5 | 3, 6 | 7, 8, 9 | 0 |
| P003 | 1, 4 | 2, 3, 5, 6 | 7 | 8, 9, 0 |
| P004 | 1, 2, 3 | 4, 5, 6 | 7, 8, 0 | 9 |
| ... | ... | ... | ... | ... |

USER ID: user002

USER ID: user001

| PATTERN ID | AUTHENTICATION CODE |
|---|---|
| P001 | G2, G1, G1, G2, G3, G4, G4 |
| P002 | G2, G1, G1, G2, G3, G3, G3 |
| P003 | G2, G1, G2, G2, G3, G4, G4 |
| P004 | G1, G2, G2, G2, G3, G3, G4 |
| ... | ... |

...

AUTHENTICATION INFORMATION ENCRYPTION SERVER APPARATUSES, SYSTEMS NON-TRANSITORY COMPUTER READABLE MEDIUMS AND METHODS FOR IMPROVING PASSWORD SECURITY

CROSS-REFERENCE TO RELATED APPLICATION

This U.S. non-provisional application claims the benefit of priority under 35 U.S.C. § 119 to Japanese Patent Application No. 2015-008296 filed on Jan. 20, 2015, in the Japanese Patent Office (JPO), the disclosure of which is incorporated herein in its entirety by reference.

BACKGROUND

1. Field

Example embodiments relate to an authentication server apparatus, a recording medium and/or an authentication method.

2. Description of the Related Art

A technology for authentication of a user is known in which respective numbers used in a password are divided into a plurality of groups so that each group includes two or more numbers, and thereby using a string of group IDs for identifying the respective groups for the authentication.

In the aforementioned conventional technology, the password input for a password registration is stored, and the password is converted into the string of the group IDs in every authentication. Here, in an authentication system for authenticating a user based on a password input by the user, it is desired that the illegal acquisition of the user's password by a third party caused by a leakage of the password registered (stored) in an authentication server be prevented. Also, it is desired that the illegal acquisition of the user's password by a third party caused by password prying (e.g., snooping, illicit observing, etc.) in the user's password input operation for the authentication be prevented.

SUMMARY

An object of at least one of the example embodiments is to prevent the illegal acquisition of the user's password for the user authentication by a third party.

In one aspect of example embodiments of the inventive concepts, there is provided an authentication server apparatus connected to a terminal device through a network, wherein the authentication server apparatus may include a memory having computer readable instructions stored thereon and at least one processor configured to execute the computer readable instructions to store, in the memory, one or more pattern descriptions, divide characters of an authentication password for authenticating a user of the terminal device into a plurality of groups, associate the divided groups of characters with identifiers (IDs) of respective groups in a pattern description of the one or more pattern descriptions, generate, based on the authentication password, an authentication code composed of a string of the IDs of the associated groups in the pattern description in response to the user inputting the authentication password for registration, the authentication code generated on a pattern description—by—pattern description basis, store the generated authentication code, transmit data of an authentication screen including one of the pattern descriptions retrieved from the memory to the terminal device, in response to a display request of the authentication screen from the terminal device, and authenticate the user based on the string of the IDs corresponding to the authentication password input by the user on the authentication screen and the authentication code corresponding to the transmitted pattern description data.

According to at least one example embodiment, the at least one processor may be configured to delete the authentication password after the authentication code composed of the string of the IDs corresponding to the respective pattern descriptions are generated based on the authentication password in response to the user inputting the authentication password for registration.

According to at least one example embodiment, the at least one processor may be configured to encrypt the string of the IDs, delete the authentication password after the authentication codes composed of the encrypted strings of the IDs corresponding to the respective pattern descriptions are generated based on the authentication password in response to the user inputting the authentication password for registration, the respective strings of the IDs being encrypted, and authenticate the user based on the encrypted string of the IDs corresponding to the authentication password input by the user in the authentication screen, and the authentication code corresponding to the transmitted pattern description data.

According to at least one example embodiment, the at least one processor may be configured to store an encrypted authentication password in a desired storage area of the memory, the authentication password being encrypted and associated with the user.

According to at least one example embodiment, the desired storage area may be disposed in an apparatus other than the authentication server apparatus.

According to at least one example embodiment, the at least one processor may be configured to transmit data of the authentication screen including another pattern description retrieved from the storage device to the terminal device, upon a user authentication resulting in failure.

In one aspect of example embodiments of the inventive concepts, there is provided a non-transitory computer-readable medium having stored therein computer readable instructions for controlling at least one processor to, when executed, serve as an authentication server apparatus connected to a terminal device through a network, wherein the at least one processor may be configured to store, in memory, one or more pattern descriptions, divide characters used of an authentication password for authenticating a user of the terminal device into a plurality of groups, associate the divided characters with identifiers (IDs) of respective groups in a pattern description of the one or more pattern descriptions, generate, based on the authentication password, an authentication code composed of a string of the IDs of the associated groups in the pattern description in response to the user inputting the authentication password for registration, the authentication code generated on a pattern description—by—pattern description basis, store the generated authentication code, transmit data of an authentication screen including one of the pattern descriptions retrieved from the memory to the terminal device, in response to a display request of the authentication screen from the terminal device, and authenticate the user based on the string of the IDs corresponding to the authentication password input by the user on the authentication screen and the authentication code corresponding to the transmitted pattern description data.

In one aspect of example embodiments of the inventive concepts, there is provided an authentication method that may include storing, on a storage device, one or more pattern descriptions, dividing, using at least one processor, characters used for an authentication password for authenticating a user of a terminal device into a plurality of groups, associating, using the at least one processor, the divided groups of characters with identifiers (IDs) of respective groups in a pattern description of the one or more pattern descriptions, generating, based on the authentication password, an authentication code composed of a string of the IDs of the groups in response to the user inputting the authentication password for registration, the authentication code generated on a pattern description—by—pattern description basis, storing the generated authentication code, transmitting data of an authentication screen including one of the pattern descriptions retrieved from the storage device to the terminal device, in response to a display request of the authentication screen from the terminal device, and authenticating the user based on the string of the IDs corresponding to the authentication password input by the user in the authentication screen and the authentication code corresponding to the transmitted pattern description data.

According to at least one example embodiment, the method may also include deleting, using the at least one processor, the authentication password after the authentication code composed of the string of the IDs corresponding to the respective pattern descriptions are generated based on the authentication password in response to the user inputting the authentication password for registration.

According to at least one example embodiment, the method may also include encrypting, using the at least one processor, the string of the IDs, deleting, using the at least one processor, the authentication password after the authentication codes composed of the encrypted strings of the IDs corresponding to the respective pattern descriptions are generated based on the authentication password in response to the user inputting the authentication password for registration, the respective strings of the IDs being encrypted, and authenticating, using the at least one processor, the user based on the encrypted string of the IDs corresponding to the authentication password input by the user in the authentication screen, and the authentication code corresponding to the transmitted pattern description data.

According to at least one example embodiment, the method may also include storing, using the at least one processor, an encrypted authentication password in a desired storage area of the storage device, the authentication password being encrypted and associated with the user.

According to at least one example embodiment, the method may also include wherein the desired storage area is disposed in an apparatus other than an authentication server apparatus.

According to at least one example embodiment, the method may also include transmitting, using the at least one processor, data of the authentication screen including another pattern description retrieved from the storage device to the terminal device, upon a user authentication resulting in failure.

In one aspect of example embodiments of the inventive concepts, there is provided an authentication method that may include setting a plurality of areas on a virtual numeric keypad or a virtual keyboard with which authentication information is input, displaying the plurality of areas arranged in accordance with one of a plurality of patterns superimposed on positions of characters in the virtual numeric keypad or the virtual keyboard, the areas arranged in different manners in accordance with the respective patterns, and determining whether one of the characters included in the area is selected in response to a selecting of the area.

According to at least one example embodiment, the method may include wherein a key arrangement of the virtual numeric keypad or the virtual keyboard may be the same as a key arrangement of any one of a virtual numeric keypad, a virtual keyboard, a hardware numeric keypad and a hardware keyboard installed in a terminal device.

According to at least one example embodiment, the method may include wherein the key arrangement may be defined by a desired standard.

According to at least one example embodiment, the method may include wherein the respective patterns may include at least three areas.

According to at least one example embodiment, the method may include wherein the areas arranged in accordance with another of the patterns may be displayed upon the authentication resulting in failure.

In one aspect of example embodiments of the inventive concepts, there is provided an apparatus that may include a memory having computer readable instructions stored thereon, and at least one processor configured to execute the computer readable instructions to set a plurality of areas on a virtual numeric keypad or a virtual keyboard with which authentication information is input, display the plurality of areas arranged in accordance with one of a plurality of patterns superimposed on positions of characters in the virtual numeric keypad or the virtual keyboard, the areas arranged in different manners in accordance with the respective patterns, and determine whether one of the characters included in the area is selected in response to a selecting of the area.

According to at least one example embodiment, the apparatus may include wherein a key arrangement of the virtual numeric keypad or the virtual keyboard is the same as a key arrangement of any one of a virtual numeric keypad, a virtual keyboard, a hardware numeric keypad and a hardware keyboard installed in a terminal device.

According to at least one example embodiment, the apparatus may include wherein the key arrangement is defined by a desired standard.

According to at least one example embodiment, the apparatus may include wherein the respective patterns include at least three areas.

According to at least one example embodiment, the apparatus may include wherein the areas arranged in accordance with another of the patterns are displayed upon the authentication resulting in failure.

Other objects, features and advantages of the inventive concepts will become more apparent from the following detailed description when read in conjunction with the accompanying drawings.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 7 is a diagram for showing an example of a pattern information table according to at least one example embodiment.

FIG. 8 is a diagram for showing an example of an authentication code information table according to at least one example embodiment.

DETAILED DESCRIPTION

Figure 1:
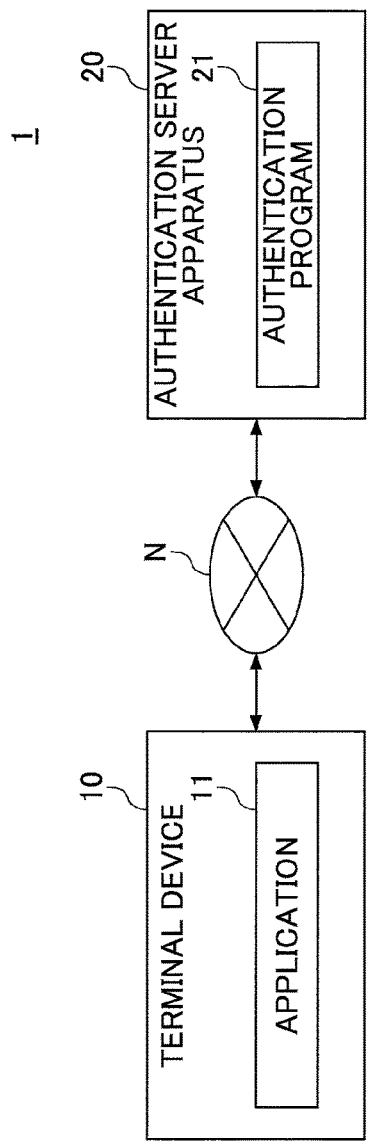
FIG. 1 is a diagram for illustrating an example configuration of an authentication system according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

<System Configuration>

First, an authentication system 1 according to at least one example embodiment will be described. FIG. 1 is a diagram for illustrating an example configuration of the authentication system according to at least one example embodiment. In the authentication system 1 shown in FIG. 1, a terminal device 10 and an authentication server apparatus 20 are connected to a network N (e.g., the Internet, a wide area network, a local area network, a personal area network, a communication network, a data network, etc.) so as to communicate with each other.

For example, the terminal device 10 may be a smartphone, a tablet terminal, a game device, a notebook PC, a desktop PC, etc., used by a user. The user can newly register or change a password for generating an authentication code in the authentication server apparatus 20 by using the terminal device 10. Also, the user can input, based on the password registered in advance (e.g., a password previously registered by the user), information for performing a user authentication in the authentication server apparatus 20 by using the terminal device 10. Here, the authentication code is information for use with the authentication process generated based on the registered or changed password, and the user authentication is performed in the authentication server apparatus 20 based on the authentication code. Detailed descriptions on the authentication code will be given below.

An application 11 for the terminal device is installed in the terminal device 10, with which the user can register or change the password in the authentication server apparatus 20. For example, the application 11 may be a program capable of performing the user authentication with the authentication server apparatus 20, such as an application, software program, applet, etc., used for Internet shopping, banking, email, social media services, messaging services, gaming, etc. The application may also be a Web browser, or other software that may be used to view webpages, that may connect to, communicate with, and/or view a webpage that may require authentication services.

For example, the authentication server apparatus 20 is an information processing apparatus including one or more computers, and/or one or more specially programmed processing devices (e.g., ASICs, FPGAs, etc.), for performing processes related to the user authentication. The authentication server apparatus 20 generates the authentication code based on the password registered or changed through the terminal device 10 to store the generated authentication code. Also, the authentication server apparatus 20 may perform the user authentication based on the authentication code generated according to the password information input and/or registered by the terminal device 10 and the stored authentication code. Further, the authentication server apparatus 20 generates an authentication screen with which the user performs the user authentication through the terminal device 10, thereby having the terminal device 10 display the authentication screen.

An authentication program 21 is installed in the authentication server apparatus 20, where the authentication program 21 is for registering or changing the password input from the terminal device 10 and for performing the user authentication.

Additionally, while only one terminal device 10 and authentication server apparatus 20 are shown in FIG. 1, the example embodiments are not limited thereto. Two or more terminal devices 10 and/or authentication server apparatuses 20 may be included in the authentication system 1.

<Hardware Configuration>

In the following, hardware configurations of the terminal device 10 and the authentication server apparatus 20 included in the authentication system 1 according to at least one example embodiment will be described.

Figure 2:
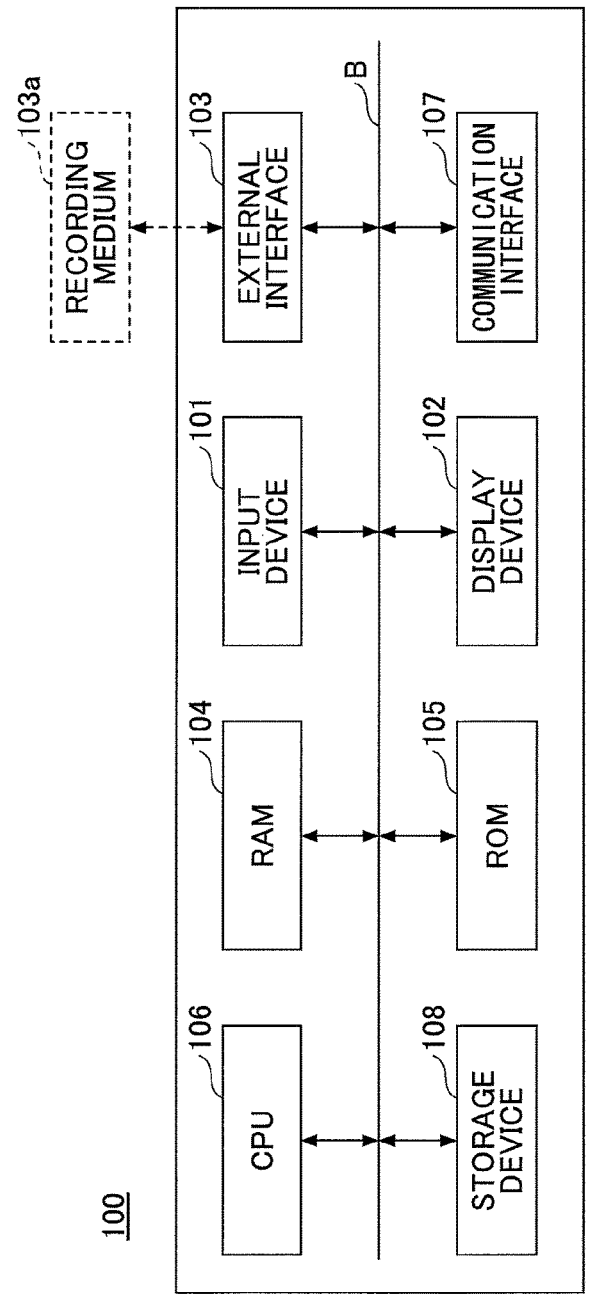
FIG. 2 is an example hardware configuration of a computer according to at least one example embodiment.

For example, the terminal device 10 and the authentication server apparatus 20 of at least one example embodiment are respectively achieved by a computer (and/or other processing device, such as a smart device, PDA, etc.) 100 whose hardware configuration is shown in FIG. 2. FIG. 2 is an example hardware configuration of the computer of at least one example embodiment.

The computer 100 shown in FIG. 2 includes an input device 101, a display device 102, an external interface 103, a RAM (Random Access Memory) 104, a ROM (Read Only Memory) 105, a CPU (Central Processing Unit) 106, a communication interface 107, and a storage device 108, which are connected with each other through a bus "B".

The input device 101 includes a touch panel, a keyboard, etc., and is used for inputting operational signals by the user. The display device 102 includes a display panel, monitor, television, touch panel, etc., and displays processing and/or generation results of the computer 100. Additionally, in the authentication server apparatus 20, the input device 101 and the display device 102 may be physically separate and can be connected and used when needed, may be detachably connected to the authentication server apparatus 20, and/or integrated into the authentication server apparatus 20.

The external interface 103 is an interface for an external device. A recording medium 103a, etc., is exemplified as the external device. Thus, the computer 100 can read/write data from/into the recording medium 103a through the external interface 103. A hard drive, optical disk, solid state drive, SD memory card, etc., are examples of the recording medium 103a.

The RAM 104 is a volatile semiconductor memory for storing program instructions and/or data temporarily. The ROM 105 is non-volatile semiconductor memory for storing programs and data even after being powered off. Programs and data are stored in the ROM 105, such as BIOS (Basic Input/Output System) to be used when activating the computer 100, OS settings and network settings.

The CPU 106 is a calculation device, and/or processing device, for executing processes by retrieving program instructions and data from the ROM 105 or the storage device 108 to load them into the RAM 104 and to process them, thereby achieving control and functions of the entire computer 100. Once the program instructions are loaded into the CPU 106, the CPU 106 is programmed to perform the program instructions, thereby transforming the CPU 106 into a special purpose processor.

The communication interface 107 is an interface for connecting the computer 100 to the network N. Thus, the computer 100 can perform data communications through the communication interface 107.

The storage device 108 is a non-volatile storage device for storing programs and data, such as a flash memory, a HDD (Hard Disk Drive), or a SSD (Solid State Drive). For example, the programs such as an OS (Operating System) that is a software for controlling the entire computer 100, and application software (for example, the application 11 or the authentication program 21) for providing functions on the OS are stored in the storage device 108. The storage device 108 manages the software, programs and data stored therein by a certain file system or a database (DB).

Additionally, while only a single input device 101, display device 102, external interface 103, RAM 104, ROM 105, CPU 106, communication interface 107, storage device 108, and bus "B" are depicted in FIG. 2, the example embodiments of the inventive concepts are not limited thereto. In other example embodiments, there may be more or less components installed in the computer 100, and each of the components of the computer 100 may number two or more.

According to the hardware configuration of the computer 100, the terminal device 10 and the authentication server apparatus 20 of at least one example embodiment may be configured and/or specially programmed to perform the respective processes described below.

<Software Configuration>

Figure 3:
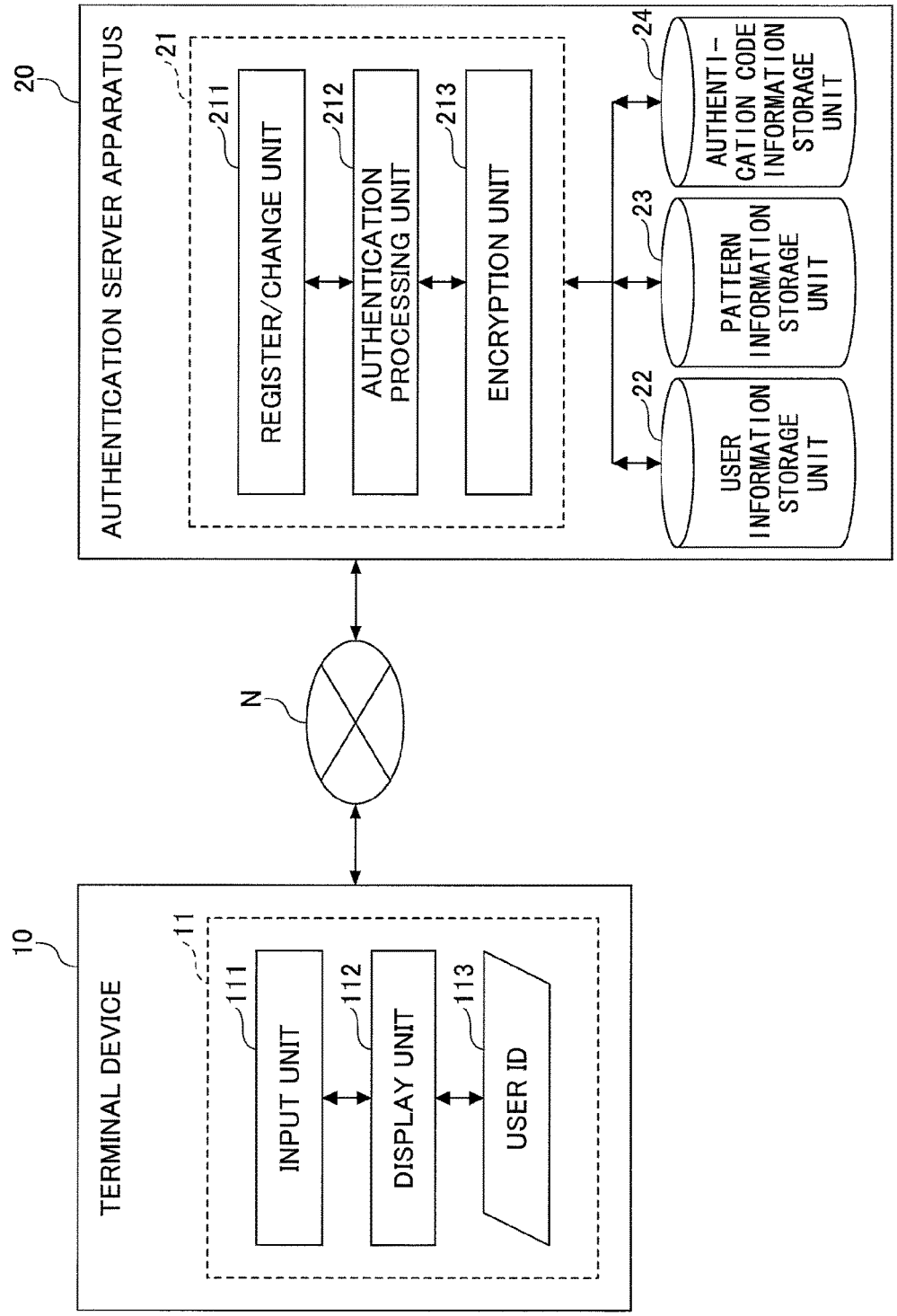
FIG. 3 is a block diagram for illustrating example process units of the authentication system according to at least one example embodiment.

In the following, a software configuration of the authentication system 1 of at least one example embodiment will be described. FIG. 3 is a block diagram for illustrating example process units of the authentication system 1 of at least one example embodiment. As described above, the application 11 is installed in the terminal device 10, which enables the user to register, set and/or change the password, and to perform the user authentication with the authentication server apparatus 20. Also, the authentication program 21 for registering, setting, and/or changing the password input through the terminal device 10 and for performing the user authentication is installed in the authentication server apparatus 20. Further, the authentication server apparatus 20 uses a user information storage unit 22, a pattern information storage unit 23, and an authentication code information storage unit 24, which are achieved by the storage device 108, or a storage device connected with the authentication server apparatus 20 through the network N.

The application 11 for the terminal device 10 includes an input unit 111 and a display unit 112. For example, the respective units are achieved by executing the application 11 by the CPU 106 or the like. Also, the application 11 for the terminal device 10 uses a user ID 113, for example, stored in the storage device 108 or the like.

The input unit 111 accepts information input by the user through the input device 101. For example, in a case where the user is going to register or change the password for generating the authentication code, the input unit 111 accepts the password to be registered, set, and/or changed. Also, for example, in a case where the user is going to have the user authentication be performed, the input unit 111 accepts information for performing the user authentication.

The display unit 112 controls the display device 102 to display a certain and/or desired screen. For example, the display unit 112 controls the display device 102 to display the authentication screen received from the authentication server apparatus 20.

The user ID 113 is information for identifying the user of the terminal device 10 in the authentication system 1. For example, the user ID 113 may be allocated by the authentication server apparatus 20 when installing the application 11, or may be set by the user. The user ID 113 may uniquely identify the user in the authentication system 1, and may be for example, a combination of arbitrary alphabetic characters and numbers arranged to avoid overlapping another user's user ID (in other words, the user IDs are unique), a telephone number associated with the user, an e-mail address of the terminal device 10 and/or user, or the like.

The authentication program 21 installed in the authentication server apparatus 20 includes a register/change unit 211, an authentication processing unit 212 and/or an encryption unit 213. For example, the respective units are achieved by executing the authentication program 21 using the CPU 106 or the like.

The register/change unit 211 generates the authentication code based on the password input by the user through the terminal device 10. For example, in a case where the newly registered password is received from the terminal device 10, the register/change unit 211 generates a plurality of certain and/or desired information items referring to a pattern information table 23D as depicted in FIG. 7 stored in the pattern information storage unit 23. Then, the register/change unit 211 generates the authentication code by encrypting the certain information items with the encryption unit 213.

Also, the encryption unit 213 encrypts the newly registered or changed password input by the user through the terminal device 10, and then, the register/change unit 211 stores the encrypted password in the user information table 22D stored in the user information storage unit 22.

The authentication processing unit 212 generates the authentication code according to the information for performing the user authentication, which is input by the user through the terminal device 10 based on the password having been registered in advance, and thereby performs the authentication using the authentication code. For example, the authentication processing unit 212 determines whether the authentication code generated according to the information input by the user through the terminal device 10 is proper by referring to an authentication code information table 24D as depicted in FIG. 8 stored in the authentication code information storage unit 24, thereby performing the authentication.

The encryption unit 213 encrypts the received information in response to a request from the register/change unit 211 or the authentication processing unit 212. Processes of encryption performed by the encryption unit 213 may be, for example AES, PGP, SHA, MD5, RSA, Diffie-Hellman, etc.

The user information storage unit 22 stores the user information table 22D. The pattern information storage unit 23 stores the pattern information table 23D. The authentication code information storage unit 24 stores the authentication code information table 24D. Detailed descriptions on the respective tables will be given below.

<Details of Processes>

In the following, the details of the processes performed by the authentication system 1 of at least one example embodiment will be described.

<Register or Change of Password>

Figure 4:
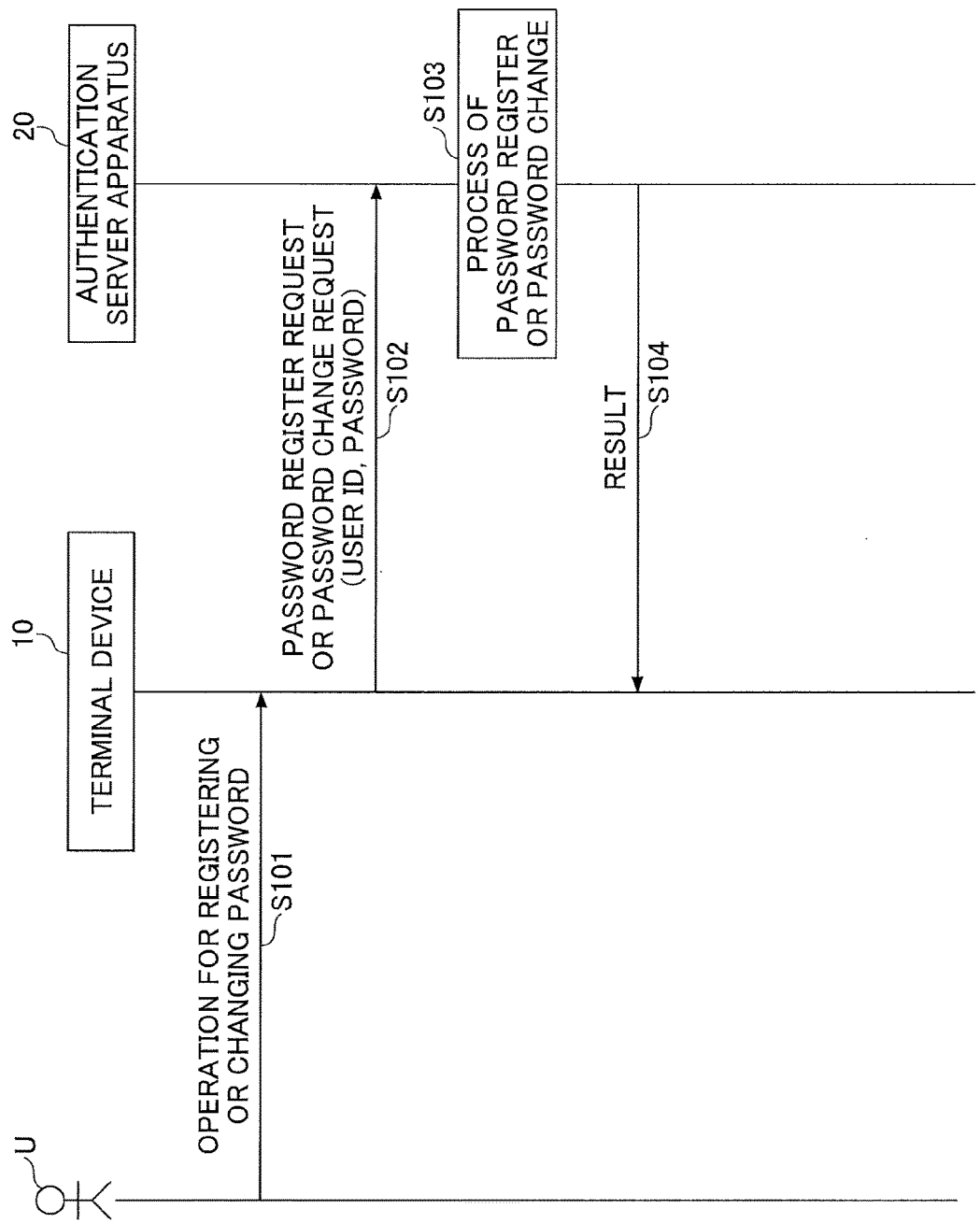
FIG. 4 is a sequence diagram for illustrating a flow of processes to register or change a password according to at least one example embodiment.

First, a process for registering, setting, or changing the password for generating the authentication code, through the user's terminal device 10, in the authentication server apparatus 20 will be described with reference to FIG. 4. FIG. 4 is a sequence diagram for illustrating a flow of processes to register or change the password of at least one example embodiment. Additionally, in the following, descriptions will be given to illustrate an example embodiment where the password to be registered or changed contains seven numbers between the numeral values 0-9. However, the inventive concepts are not limited thereto and may also include the use of any amount of numbers (including binary, decimal, hexadecimal, etc.), letters, characters, symbols, images, icons, sounds, biometric information, etc.

In step S101, the user U of the terminal device 10 performs an operation for registering and/or setting a password (hereinafter referred to as registering a password), or changing the password. For example, such an operation for registering or changing the password can be input in a certain screen (password register screen or password change screen) displayed on the display device 102 by the application 11.

In step S102, upon accepting the input of the password to be registered or changed, the input unit 111 of the terminal device 10 transmits a password register request (or password change request) including the input password and, the user ID 113 to the authentication server apparatus 20. Additionally, the password register request (or password change request) may include other information (e.g., location information, biometric information, answers to security questions, other identity verification information, captcha information, etc.). The terminal device 10 may encrypt the transmission of information between the terminal device 10 and the authentication server apparatus 20 using, for example, Secure Sockets Layer (SSL), Transport Layer Security (TLS), Internet Protocol Security (IPSec), etc., to further improve the security of the user's password/authentication information and to reduce the risk that the password information is exposed to unauthorized parties.

In step S103, upon accepting the password register request (or password change request), the register/change unit 211 of the authentication server apparatus 20 performs a process of password registering or password changing. In the process of password register or password change, the authentication code is generated based on the password included in the password register request (or password change request). The generated authentication code is then associated with the user ID 113, and is stored in the authentication code information table 24D. More detailed descriptions on the process of password register or password change will be given below.

In step S104, the authentication server apparatus 20 transmits a result of the process indicating that the process of password register or password change was completed to the terminal device 10. Thus, the flow of processes to register or change the password of at least one example embodiment is completed. The authentication server apparatus 20 may encrypt the transmission of information between the authentication server apparatus 20 and the terminal device 10 using, for example, Secure Sockets Layer (SSL), Transport Layer Security (TLS), Internet Protocol Security (IPSec), etc., to further improve the security of the user's password/authentication information and to reduce the risk that the password information is exposed to unauthorized parties.

Additionally, in a case where the password input in step S101 does not meet a desired strength requirement (e.g., the password is not of the required length, the same number is repeated in the password, the password input has previously been used, etc.), the authentication server apparatus 20 may transmit a result of process indicating an error in the process to the terminal device 10 before performing the process of step S103.

Figures 5, 6:
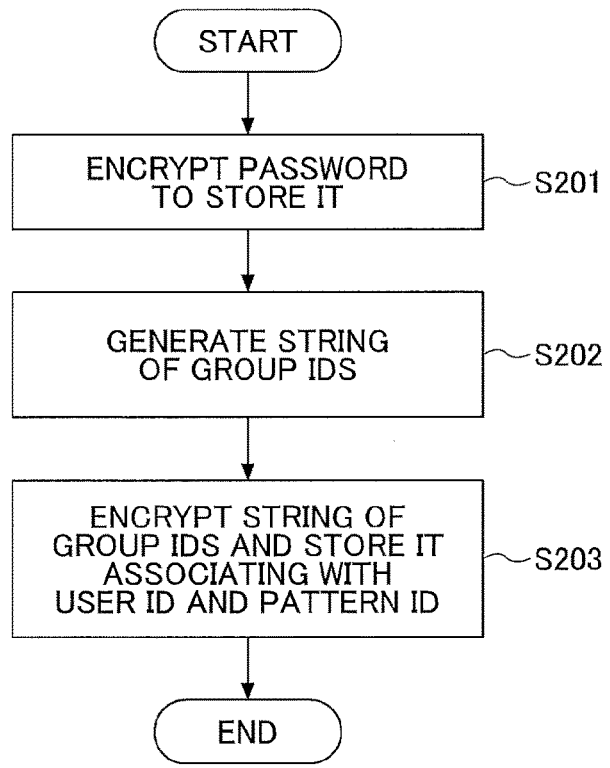
FIG. 5 is a flowchart for illustrating an example process of password register or password change according to at least one example embodiment.
FIG. 6 is diagram for showing an example of a user information table according to at least one example embodiment.

In the following, the process of password register or password change performed in step S103 will be described with reference to FIG. 5. FIG. 5 is a flowchart for illustrating an example process of password register or password change of at least one example embodiment.

In step S201, the register/change unit 211 of the authentication server apparatus 20 has the encryption unit 213 encrypt the password included in the password register request or the password change request. Then, the register/change unit 211 stores the encrypted password, associated with the user ID 113 included in the password register request or the password change request, in the user information table 22D.

Here, for example, the user information table 22D has a design as shown in FIG. 6. That is, the user information table 22D stores the user ID and the encrypted password which are associated with each other. Additionally, in FIG. 6, although passwords of seven digits are shown, in an actual use, the passwords have been encrypted by the encryption unit 213. Therefore, for example, in a case where the user ID "user001" and the password "3456789" are included in the password register request or the password change request, the register/change unit 211 has the encryption unit 213 encrypt the password "3456789". Then, the register/change unit 211 stores the encryption result of the password "3456789" in the user information table 22D, which is associated with the user ID "user001".

As described above, the register/change unit 211 of the authentication server apparatus 20 stores the encryption result of the password included in the password register request or the password change request, associated with the user ID 113, in the user information table 22D. However, in the authentication system 1 of at least one example embodiment, it is not necessary to store the encrypted password in the user information table 22D since the user authentication is performed by using the authentication code. However, when the encrypted password is stored in the user information table 22D, for example, a so-called password reminder function may be easily provided for a user who has forgotten the registered or changed password.

In step S202, the register/change unit 211 of the authentication server apparatus 20 generates a string of a plurality of group IDs based on the password included in the password register request or the password change request by referring to the pattern information table 23D. Then, for example, the register/change unit 211 deletes the password from the memory of the authentication server apparatus 20 such as the RAM 104. Thus, the probability of leakage and/or exposure of the non-encrypted password may be reduced, limited and/or prevented, by deleting the password in the memory after the register/change unit 211 generates the string of the group IDs based on the password. In other words, by deleting the password from the memory, the security of the user's password/authentication information is further improved and there is a reduced risk that the password/authentication information may be exposed to unauthorized parties.

Here, for example, the pattern information table 23D has a design as shown in FIG. 7. That is, the pattern information table 23D includes group patterns describing patterns for dividing the numbers 0-9 which constitute the password into a plurality of groups, and pattern IDs for identifying the respective group patterns.

For example, according to the pattern ID "P001", numbers "1", "2", "4" and "5" are included in the group identified by the group ID "G1", while numbers "3" and "6" are included in the group identified by the group ID "G2". Similarly, numbers "7" and "0" are included in the group identified by the group ID "G3", while numbers "8" and "9" are included in the group identified by the group ID "G4". Thus, in the pattern information table 23D, group patterns indicating patterns for dividing the numbers which constitute the password into a plurality of groups, and pattern IDs for identifying the respective group patterns are stored. Therefore, for example, in a case where the password "3456789" is included in the password register request or the password change request, the register/change unit 211 generates the string of the group IDs according to every pattern ID as follows.

According to the pattern ID "P001", "3" belongs to the group of the group ID "G2", while "4" belongs to the group of the group ID "G1". Similarly, "5" belongs to the group of the group ID "G1", "6" belongs to the group of the group ID "G2", "7" belongs to the group of the group ID "G3", "8" belongs to the group of the group ID "G4", and "9" belongs to the group of the group ID "G4". Thus, according to the pattern ID "P001", the register/change unit 211 generates the string of the group IDs "G2, G1, G1, G2, G3, G4, G4" based on the password "3456789".

According to the pattern ID "P002", "3" belongs to the group of the group ID "G2", while "4" belongs to the group of the group ID "G1". Similarly, "5" belongs to the group of the group ID "G1", "6" belongs to the group of the group ID "G2", "7" belongs to the group of the group ID "G3", "8" belongs to the group of the group ID "G3", and "9" belongs to the group of the group ID "G3". Thus, according to the pattern ID "P002", the register/change unit 211 generates the string of the group IDs "G2, G1, G1, G2, G3, G3, G3" based on the password "3456789".

Similarly to the aforementioned method, the string of the group IDs "G2, G1, G2, G2, G3, G4, G4" and "G1, G2, G2, G2, G3, G3, G4" are respectively generated, based on the password "3456789", according to the group ID "P003" and "P004". Thus, the register/change unit 211 generates the string of the group IDs, based on the password included in the password register request or the password change request, according to every pattern ID.

Additionally, in the aforementioned description, although numbers 0-9 which constitute the password are divided into four groups, is the inventive concepts are not limited thereto. For example, the numbers 0-9 which constitute the password may be divided into an arbitrary number of groups, the number of groups being greater than or equal to two. Also, the password may include not only the numbers but also alphabetic characters, symbols, and the like.

In step S203, the register/change unit 211 of the authentication server apparatus 20 has the encryption unit 213 encrypt the respective strings of the group IDs generated in step S202, and thereby generates the authentication codes. Then, the register/change unit 211 stores the generated authentication codes in the authentication information table

24D, where the authentication codes are associated with the user ID included in the password register request or the password change request and the pattern IDs.

Here, for example, the authentication code information table 24D has a design as shown in FIG. 8. That is, the authentication code information table 24D stores the authentication code generated by encrypting the string of the group IDs for every user ID and pattern ID. Additionally, in FIG. 8, although the strings of the group IDs are shown as the authentication codes, in an actual use, the encryption unit 213 also encrypts the strings of the group IDs to store them as the authentication codes.

As described above, in the authentication system 1 of at least one example embodiment, when the user newly registers the password or changes the registered password by using the terminal device 10, a plurality of the authentication codes are generated based on the registered or changed password. Thus, the plurality of the authentication codes are generated to be stored in registering or changing the password. Then, the authentication in the user authentication (described below) is performed by using the plurality of the authentication codes stored in the authentication server apparatus 20.

<User Authentication>

Figure 9:
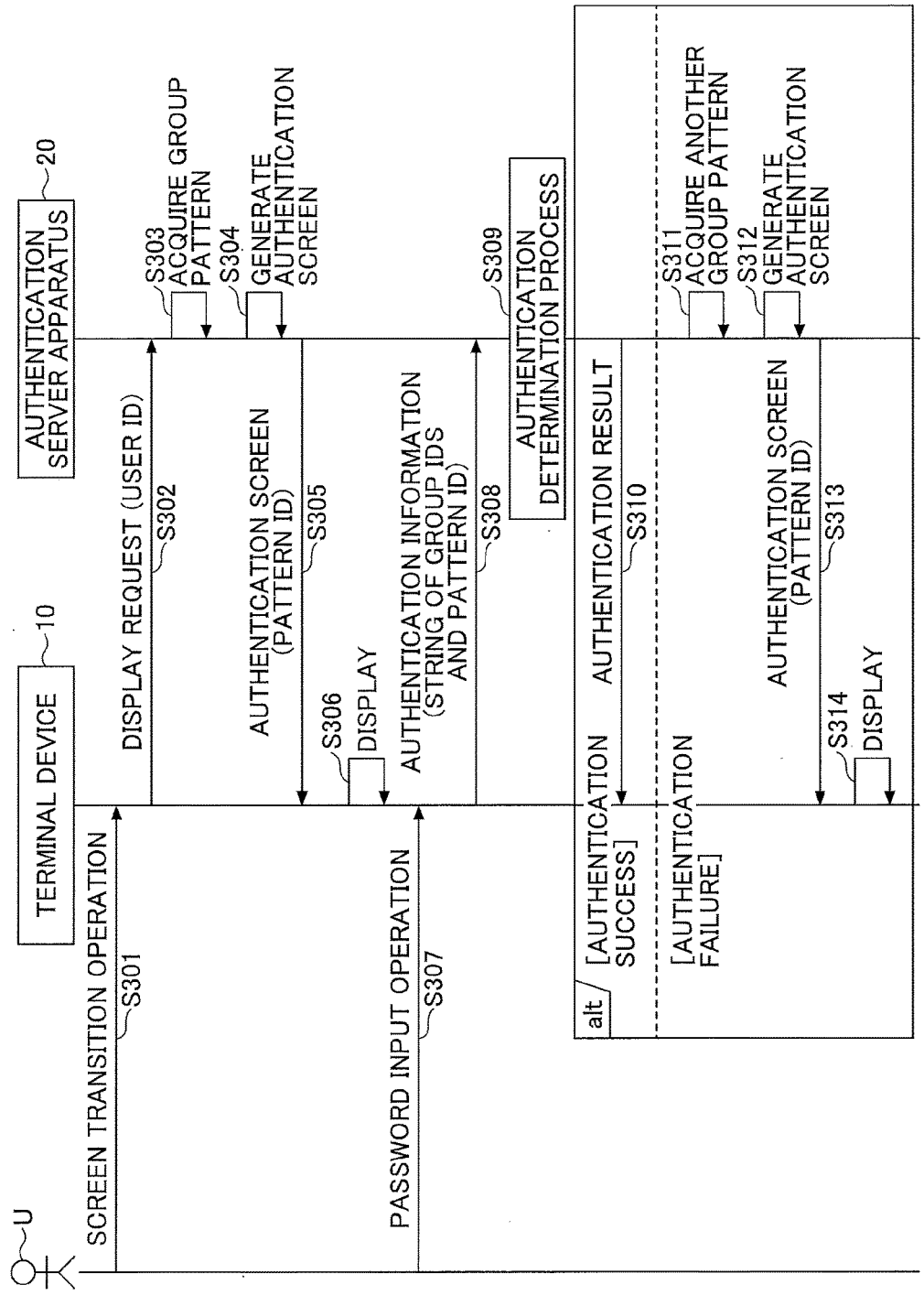
FIG. 9 is a sequence diagram for illustrating a flow of processes in user authentication according to at least one example embodiment.

In the following, processes preformed in a case where the user has the authentication server apparatus 20 perform the user authentication by using the terminal device 10 will be described with reference to FIG. 9. FIG. 9 is a sequence diagram for illustrating a flow of processes in the user authentication of at least one example embodiment.

In step S301, the user U of the terminal device 10 performs a screen transition operation for transitioning to the authentication screen for performing the user authentication. For example, when executing an application for Internet shopping, the screen transition operation corresponds to that for transitioning to a log-in screen for logging-in as in purchasing a product, or the like.

In step S302, the terminal device 10 transmits a display request of the authentication screen including the user ID 113 to the authentication server apparatus 20.

In step S303, upon receiving the display request from the terminal device 10, the authentication processing unit 212 of the authentication server apparatus 20 acquires a pattern ID and the group pattern corresponding to the pattern ID from the pattern information table 23D.

Here, in step S303, the authentication processing unit 212 acquires the pattern ID and the group pattern corresponding to the pattern ID from the pattern information table 23D at random. For example, in a case where there exists pattern IDs "P001" to "P100", a random number greater than or equal to "1" and equal to or less than "100" is generated to acquire the pattern ID corresponding to the generated random number and the group pattern corresponding to the pattern ID.

Additionally, the method for acquiring the pattern ID and the group pattern corresponding to the pattern ID from the pattern information table 23D by the authentication processing unit 212 is not limited to the aforementioned method. For example, the authentication processing unit 212 may acquire the pattern ID and the group pattern corresponding to the pattern ID in accordance with the user U's password registered in advance. That is, the authentication processing unit 212, referring to the user U's password registered in advance, acquires the pattern ID and the group pattern corresponding to the pattern ID, according to which the password is divided into groups greater than or equal to a certain number (for example, three groups or more). For example, in a case where there exists pattern IDs "P001" to "P100", a random number is generated as described above to acquire the pattern ID corresponding to the generated random number and the group pattern corresponding to the pattern ID while eliminating the pattern IDs according to which the user U's password is divided into groups less than the certain number.

In step S304, the authentication processing unit 212 of the authentication server apparatus 20 generates the authentication screen based on the group pattern acquired in step S303.

Figure 10A:
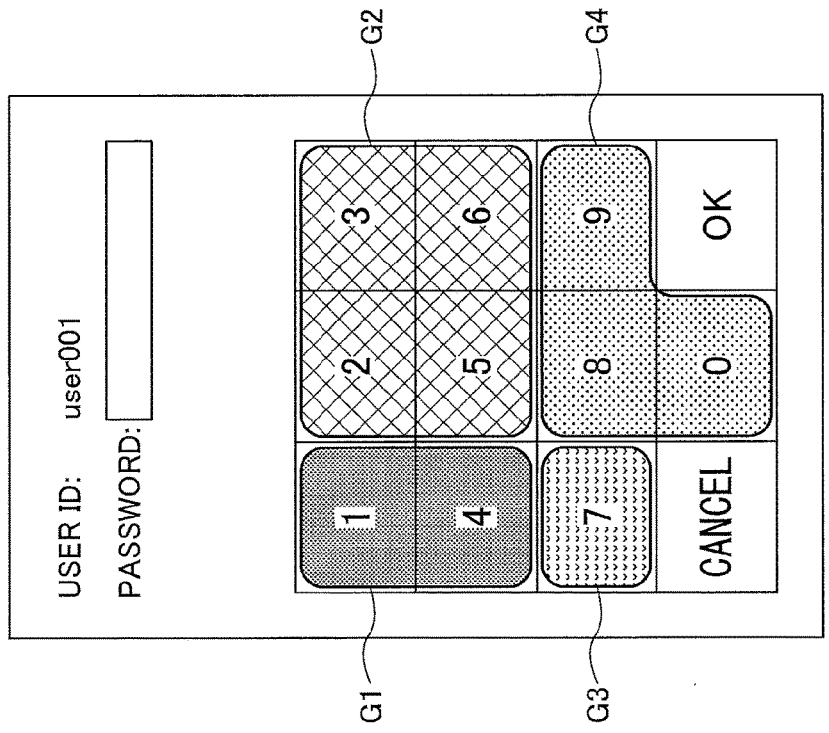
FIG. 10A is a diagram for showing an example of an authentication screen according to at least one example embodiment.

For example, in a case where the group ID "P002" is acquired in step S303, the authentication processing unit 212 generates the authentication screen 1000 as shown in FIG. 10A. In the authentication screen 1000, an area G1 is superimposed on positions "1", "2", "4" and "5" in the numeric keypad (software numeric keypad), an area G2 is superimposed on positions "3" and "6" in the numeric keypad, an area G3 is superimposed on positions "7", "8" and "9" in the numeric keypad, and an area G4 is superimposed on a position "0" in the numeric keypad.

Figure 10B:
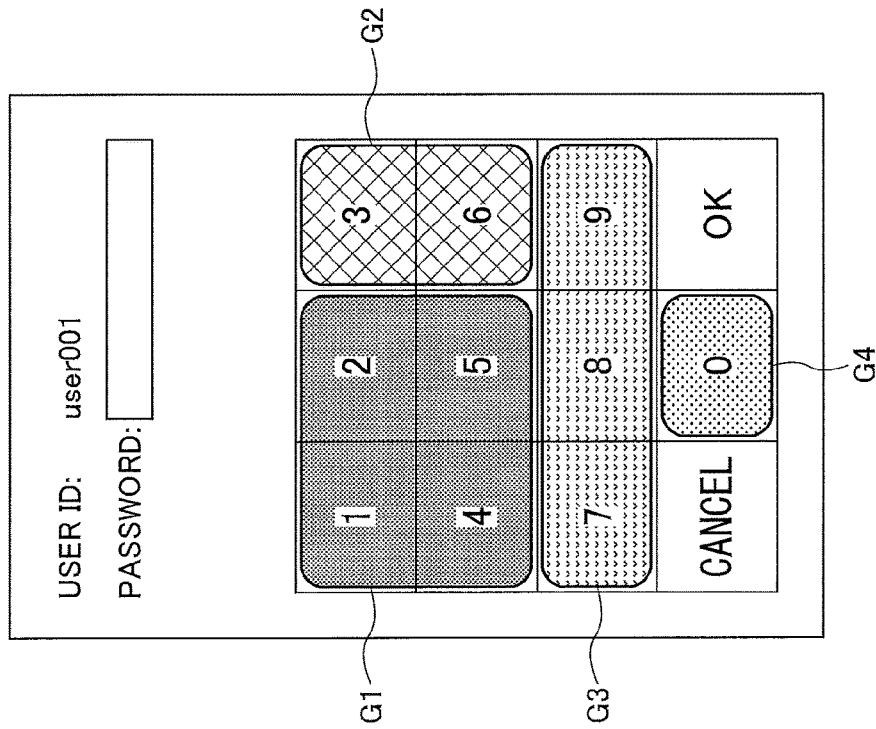
FIG. 10B is a diagram for showing another example of an authentication screen according to at least one example embodiment.

Also, for example, in a case where the group ID "P003" is acquired in step S303, the authentication processing unit 212 generates the authentication screen 2000 as shown in FIG. 10B. In the authentication screen 2000, an area G1 is superimposed on positions "1" and "4" in the numeric keypad (software numeric keypad), an area G2 is superimposed on positions "2", "3", "5" and "6" in the numeric keypad, an area G3 is superimposed on a position "7" in the numeric keypad, and an area G4 is superimposed on positions "8", "9" and "0" in the numeric keypad.

Thus, according to the group pattern corresponding to the acquired pattern ID, the authentication processing unit 212 superimposes the areas corresponding to the groups on positions of numbers in the software numeric keypad, where the numbers are divided in accordance with the group pattern. Additionally, the software numeric keypad is also referred to as a screen numeric keypad or virtual numeric keypad.

Additionally, for example, the generated authentication screen of at least one example embodiment is not limited to the examples shown in FIG. 10A and FIG. 10B. For example, colors of the respective positions of the numbers in the software numeric keypad may be varied. That is, the positions of numbers belonging to a group may be displayed in the same color, while the positions of numbers belonging to another group may be displayed in a different color (in other words, the positions of numbers in the software numeric keypad may be displayed with colors corresponding to the respective groups).

Also, although the authentication screen including the software numeric keypad is described above, this is not a limiting example. The authentication screen including a software keyboard, which has keys for and/or input options for alphabetic letters, characters, symbols, numbers, images, icons, sounds, biometric information, and the like, may be generated and displayed. Here, for example, a key arrangement of the software numeric keypad or the software keyboard may be defined according to one or more standards in respective countries, such as JIS and/or ASCII. Additionally, the software keyboard is also referred to as a screen keyboard or a virtual keyboard.

In step S305, the authentication processing unit 212 of the authentication server apparatus 20 transmits the authentication screen generated in step S304 to the terminal device 10. In addition to the authentication screen, the authentication processing unit 212 transmits the pattern ID corresponding to the group pattern used for generating the authentication screen to the terminal device 10.

In step S306, the display unit 112 of the terminal device 10 displays the authentication screen received from the authentication server apparatus 20 on the display device 102. Hereinafter, descriptions are given in a case where the authentication screen 1000 is displayed on the display device 102 of the user U's terminal device 10.

In step S307, the user U of the terminal device 10 inputs the password in the authentication screen 1000 displayed on the display device 102 through the input device 101.

Here, in the input operation of the password, when inputting a number included in an area in the authentication screen 1000, the user U may select an arbitrary position in the area (for example, in a case where the terminal device 10 is a smartphone and the input device 101 is a touch panel, the user U may tap the arbitrary position in the area). For example, when inputting the number "3" in the authentication screen 1000, the user U may select an arbitrary position in the area G2. Thus, the input unit 111 accepts the input of the group ID "G2" corresponding to the area G2. Similarly, when inputting the number "7", the user U may select an arbitrary position in the area G3. Thus, the input unit 111 accepts the input of the group ID "G3" corresponding to the area G3.

Additionally, in a case where the terminal device 10 is a notebook PC or a desktop PC, etc., the user U may perform the aforementioned input operation with a keyboard (hardware keyboard), mouse, and/or other physical input that is disposed as the input device 101. In this case, the user U inputs an arbitrary number belonging to the area in the authentication screen 1000 through the hardware keyboard. That is, for example, in a case where the user U is going to input number "3", the user U may input number "3" or "6" included in the area G2 with the hardware keyboard. Similarly, in a case where the user U is going to input number "7", the user U may input any one of numbers "7", "8" and "9" included in the area G3 with the hardware keyboard.

Thus, a third party cannot recognize which number in the area is input by the user. Therefore, the probability of an illegal acquisition of the user's password by a third party is reduced, limited and/or prevented, which is caused by password prying from behind the user in the user's password input operation, or the like. Thus, the illegal acquisition of the user's password by a third party caused by password prying from behind the user is reduced, limited and/or prevented when the user in a public space (for example, on a train) operates the terminal device 10 such as a smartphone to enjoy Internet shopping. In other words, by rearranging and/or scrambling the password/authentication information input user interface, the security of the user's password/ authentication information is further improved and there is a reduced risk that the password/authentication information may be exposed to unauthorized parties.

In step S308, the terminal device 10 transmits the authentication information including the string of the group IDs corresponding to the password input through the authentication screen 1000 and the pattern ID received in step S305 to the authentication server apparatus 20.

For example, in a case where the user U inputs the password "3456789" in the authentication screen 1000, the terminal device 10 transmits the authentication information including the string of the group IDs "G2, G1, G1, G2, G3, G3, G3" and the pattern ID "P002" to the authentication server apparatus 20.

In step S309, the authentication processing unit 212 of the authentication server apparatus 20 performs an authentication determination process, thereby determining whether the password input by the user U in step S307 is proper. More specifically, the authentication processing unit 212 determines whether the authentication code generated by encrypting the received string of the group IDs with the encryption unit 213 is the same as the user U's authentication code corresponding to the pattern ID stored in the authentication code information table 24D. Details of such an authentication determination process will be described below.

In step S310, in a case where the authentication codes are determined to be the same in step S309, the authentication processing unit 212 of the authentication server apparatus 20 transmits the authentication result indicating a user authentication success to the terminal device 10.

In step S311, in a case where the authentication codes are determined not to be the same in step S309, the authentication processing unit 212 of the authentication server apparatus 20 acquires, from the pattern information table 23D, a pattern ID and the group pattern corresponding to the newly acquired pattern ID, wherein the newly acquired pattern ID is different from the pattern ID acquired in step S303.

In step S312, the authentication processing unit 212 of the authentication server apparatus 20 generates the authentication screen based on the group pattern acquired in step S311.

In step S313, the authentication processing unit 212 of the authentication server apparatus 20 transmits the authentication screen generated in step S312 to the terminal device 10. Additionally, the authentication processing unit 212 transmits the pattern ID of the group pattern used for generating the authentication screen to the terminal device 10, in addition to the authentication screen.

In step S314, the display unit 112 of the terminal device 10 controls the display device 102 to display the authentication screen received from the authentication server apparatus 20. Thus, in a case where the user authentication performed in step S309 fails, the authentication server apparatus 20 has the display device 102 of terminal device 10 display another authentication screen to prompt the user U to reenter the password. Additionally, in a case where the user authentication failure occurs a desired and/or certain number of times (for example, three times), the user's account may be locked instead of displaying the other authentication screen.

Additionally, in a case where the user authentication fails, the authentication server apparatus 20 may have the display device 102 of the terminal device 10 display the same authentication screen as that in the former authentication. That is, the authentication server apparatus 20 may transmit an authentication result indicating the user authentication failure to the terminal device 10, without performing the processes of steps S311 and S312.

Figure 11:
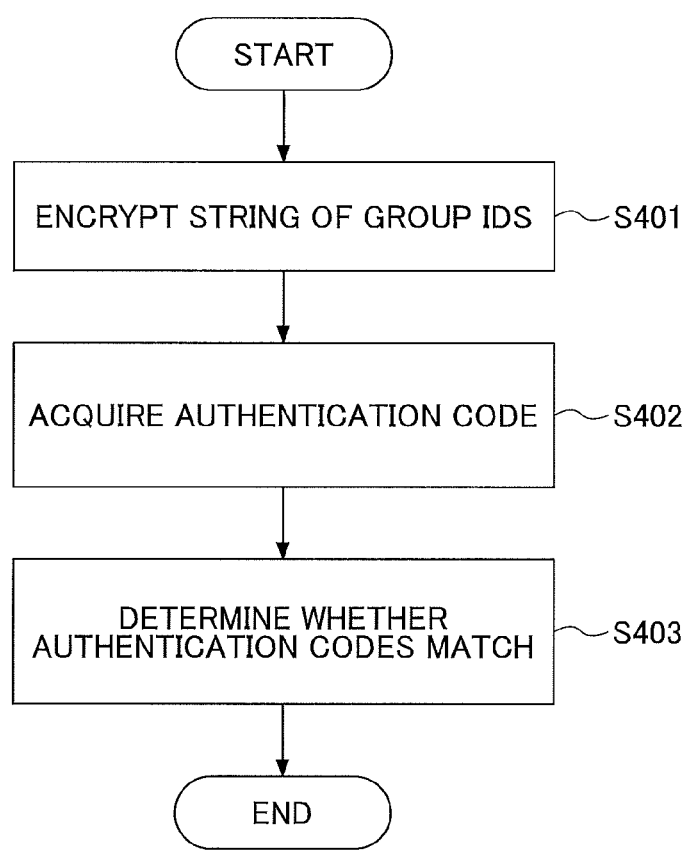
FIG. 11 is a flowchart for illustrating an example of an authentication determination process according to at least one example embodiment.

In the following, the authentication determination process performed in step S309 will be described in detail with reference to FIG. 11. FIG. 11 is a flowchart for illustrating an example of the authentication determination process of at least one example embodiment.

In step S401, the authentication processing unit 212 of the authentication server apparatus 20 generates the authentication code (referred to as a first authentication code) by encrypting the string of the group IDs included in the authentication information by the encryption unit 213.

In step S402, the authentication processing unit 212 of the authentication server apparatus 20 acquires the authentication code (referred to as a second authentication code) from the authentication code information table 24D based on the user ID 113 received in step S302 and the pattern ID included in the authentication information. For example, in a case where the user ID 113 is "user001" and the pattern ID is "P002", the authentication code generated by encrypting the string of the group IDs "G2, G1, G1, G2, G3, G3, G3" is acquired from the authentication code information table 24D.

In step S403, the authentication processing unit 212 of the authentication server apparatus 20 determines whether the first authentication code is the same as the second authentication code. Thus, the authentication for determining whether the user U is a proper user can be performed. As described above, in the authentication server apparatus 20 of at least one example embodiment, the user authentication is performed without directly using the password registered or changed by the user (that is, after the password is registered or changed, the password is not used for the user authentication). Consequently, the probability of a usable password being leaked through illegal activities such as hacking the user information storage unit 22 of a secure server apparatus, etc., is reduced, limited, and/or prevented. In other words, by encrypting the string of the group IDs included in the authentication information, the protection of password information on a server is further improved and, consequently, the security of the user's password/authentication information is more greatly improved and there is a further reduced risk that the password/authentication information may be exposed to unauthorized parties.

<Summary>

As described above, in the authentication system 1 according to some example embodiments, a plurality of the authentication codes are generated in registering or changing the password by the user, thereby performing the user authentication by using the plurality of the authentication codes. Therefore, in the authentication system 1 of some example embodiments, the password is not required to be stored in the authentication server apparatus 20 after the password is registered and/or changed by the user. Therefore, for example, the chances of a password leakage is reduced, limited, and/or prevented by achieving the user information storage unit 22 on a secure server apparatus, etc., other than the authentication server apparatus 20.

Also, in the authentication system 1 of at least one example embodiment, the authentication screen for the user to input the password is displayed by the terminal device 10, where one or more characters (numbers, alphabetic characters, symbols, combinations thereof, etc.) which constitute the password are divided into groups. Therefore, for example, a third party watching the user's password input operation from behind of the user cannot recognize which character is input. Thus, the chances of a leakage of the password caused by password prying during the user's password input operation is reduced, limited and/or prevented.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. An authentication server apparatus connected to a terminal device through a network, the authentication server apparatus comprising:
   a memory having computer readable instructions stored thereon; and
   at least one processor configured to execute the computer readable instructions to,
      store, in the memory, a plurality of pattern descriptions in a pattern information table, the plurality of pattern descriptions collectively including combinations of characters possible for a set character set used for an authentication password, each of the plurality of pattern descriptions associated with a pattern identifier (ID) in the pattern information table, receive a user authentication password for authenticating a user of the terminal device from the terminal device, encrypt the received user authentication password, divide characters of the encrypted user authentication password into a plurality of groups, associate the divided groups of characters with group identifier (IDs) of the respective groups in the pattern information table, generate, based on the received user authentication password, an authentication code composed of a string of the group IDs associated with the divided groups, the authentication code generated on a pattern description-by-pattern description basis, encrypt the generated authentication code, store the encrypted authentication code in association with a user ID corresponding to the user in the memory and not storing the received user authentication password in the memory, transmit data of an authentication screen including one of the pattern IDs of the pattern descriptions retrieved from the memory to the terminal device, in response to a display request of the authentication screen from the terminal device, receive user input of a password from the terminal device using the authentication screen, and authenticate the user based on the string of the group IDs corresponding to the password input by the user on the authentication screen and the stored encrypted authentication code, associated with the user ID corresponding to the user, corresponding to the transmitted one of the pattern IDs of the pattern descriptions.

2. The authentication server apparatus according to claim 1, wherein the at least one processor is further configured to delete the encrypted user authentication password after the authentication code is generated.

3. The authentication server apparatus according to claim 1, wherein the at least one processor is further configured to:
encrypt the string of the group IDs;
delete the encrypted user authentication password after the authentication codes composed of the encrypted string of the group IDs are generated; and
authenticate the user based on the encrypted string of the group IDs.

4. The authentication server apparatus according to claim 3, wherein the at least one processor is further configured to store the encrypted string of the group IDs in a storage area of the memory, the encrypted string of the group IDs associated with the user.

5. The authentication server apparatus according to claim 4, wherein the storage area is disposed in an apparatus other than the authentication server apparatus.

6. The authentication server apparatus according to claim 1, wherein the at least one processor is further configured to transmit data of the authentication screen including another pattern description retrieved from the memory to the terminal device, upon a user authentication resulting in failure.

7. An authentication method comprising:
storing, using at least one processor, a plurality of pattern descriptions in a pattern information table on a storage device, the plurality of pattern descriptions collectively including combinations of characters possible for a set character set used for an authentication password, each of the plurality of pattern descriptions associated with a pattern identifier (ID) in the pattern information table;

receiving, using the at least one processor, a user authentication password for authenticating a user of a terminal device from the terminal device;

encrypting, using the at least one processor, the received user authentication password;

dividing, using at least one processor, characters of the encrypted user authentication password into a plurality of groups;

associating, using the at least one processor, the divided groups of characters with group identifiers (IDs) of the respective groups in the pattern information table;

generating, using the at least one processor, based on the received user authentication password, an authentication code composed of a string of the group IDs associated with the divided groups in response to the user inputting the authentication password for registration, the authentication code generated on a pattern description—by—pattern description basis;

encrypting, using the at least one processor, the generated authentication code;

storing, using the at least one processor, the encrypted authentication code in association with a user ID corresponding to the user in the storage device and not storing the received user authentication password in the storage device;

transmitting, using the at least one processor, data of an authentication screen including one of the pattern IDs of the pattern descriptions retrieved from the storage device to the terminal device, in response to a display request of the authentication screen from the terminal device;

receiving, using the at least one processor, user input of a password from the terminal device using the authentication screen; and authenticating, using the at least one processor, the user based on the string of the group IDs corresponding to the password input by the user in the authentication screen and the stored encrypted authentication code, associated with the user ID corresponding to the user, corresponding to the transmitted one of the pattern IDs of the pattern descriptions.

8. The method according to claim 7, further comprising:
deleting, using the at least one processor, the encrypted user authentication password after the authentication code is generated.

9. The method according to claim 7, further comprising:
encrypting, using the at least one processor, the string of the group IDs;
deleting, using the at least one processor, the encrypted user authentication password after the authentication codes composed of the encrypted strings of the group IDs are generated; and
authenticating, using the at least one processor, the user based on the encrypted string of the group IDs.

10. The method according to claim 9, further comprising:
storing, using the at least one processor, the encrypted string of the group IDs in a storage area of the storage device, the encrypted string of the group IDs associated with the user.

11. The method according to claim 10, wherein the storage area is disposed in an apparatus other than an authentication server apparatus.

12. The method according to claim 7, further comprising:
transmitting, using the at least one processor, data of the authentication screen including another pattern description retrieved from the storage device to the terminal device, upon a user authentication resulting in failure.

* * * * *